W. KEARNEY.
Furnace Grate-Bar.
No. 108,796.  Patented Nov. 1, 1870.
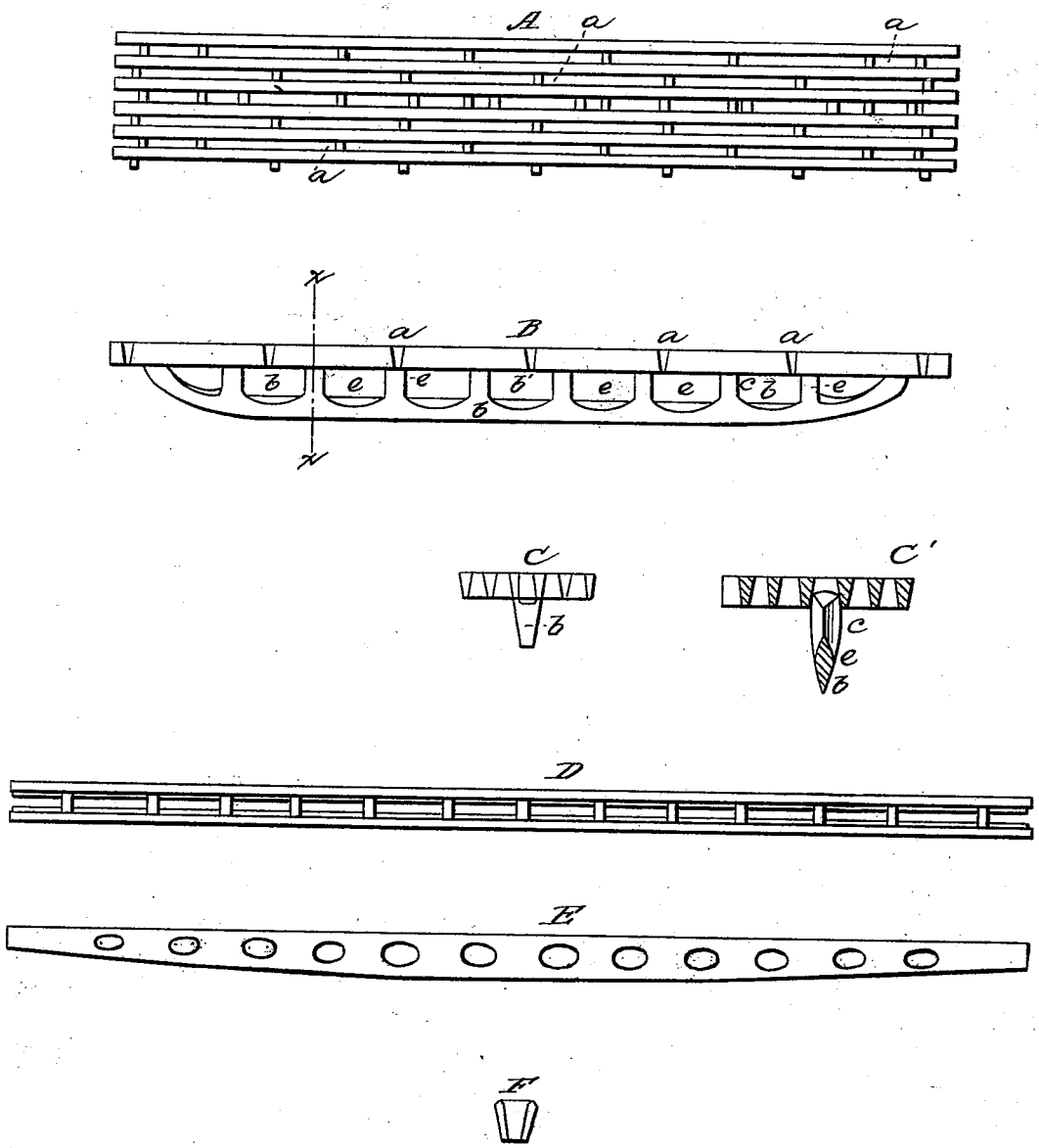

United States Patent Office.

WILLIAM KEARNEY, OF BELLEVILLE, ASSIGNOR TO HIMSELF AND A. D. GRAHAM, OF NEWARK, NEW JERSEY.

Letters Patent No. 108,796, dated November 1, 1870.

IMPROVEMENT IN GRATE-BARS AND BEARERS.

The Schedule referred to in these Letters Patent and making part of the same.

I, WILLIAM KEARNEY, of the town of Belleville, in the county of Essex and State of New Jersey, have invented certain Improvements in Grate-Bars and Bearers for Boiler and other Furnaces, of which the following is a specification.

The object of my invention is to provide grate-bars and bearers which shall be so constructed as to prevent the collection of ashes on any part thereof, whereby they are better adapted to preserve their original form, and rendered capable of longer service.

In the drawing—

A represents a plan view of the bars and brace;

B, a longitudinal section;

C, an end view; and

C', a transverse section through the line $x\ x$ of B.

D represents the bearer in top-plan view;

E is a side elevation; and

F, an end view of the same.

I connect a series of bars by means of cross-bars, $a$, and cast in one piece with these the longitudinal brace $b$.

Openings, $b'$, are formed in the brace, and the vertical parts $c$ are made knife-edged at their upper ends, as are also those portions, $e$, of the brace between them.

The ends of the bars are left open or unconnected, as shown in figure A.

The bearer, shown in figs. D E F, consists of two parallel bars connected by tubes, and beveled on their upper edges, similarly to the parts $c$ and $e$ of the grate-bar.

Ashes cannot effect a lodgment on the edged parts of the brace and bearer, and the openings in them permit the circulation of heated air and gases of combustion, also the passage of flame, thereby preventing warping of the same, which inevitably results from inequality of temperature.

I claim as my improvement—

1. The brace, constructed and connected with a grate-bar, as shown and described.

2. The bearer, constructed as shown and described.

WILLIAM KEARNEY.

Witnesses:
W. M. GOODING,
EDWARD COLEVER.